United States Patent [19]

Mikeska

[11] Patent Number: 5,052,911
[45] Date of Patent: Oct. 1, 1991

[54] UNDERWATER PELLETIZER BLADE

[76] Inventor: Olvin J. Mikeska, 657 W. Sanders, Belville, Tex. 77418

[21] Appl. No.: 343,572

[22] Filed: Apr. 27, 1989

[51] Int. Cl.⁵ .......................................... B29C 47/08
[52] U.S. Cl. ...................................... 425/67; 83/350; 425/308; 425/309; 425/310; 425/313
[58] Field of Search ............... 425/308, 309, 310, 311, 425/313, 67; 264/142, 143; 83/350, 354, 355, 913, 651, 663, 666, 672, 673, 675

[56] References Cited

U.S. PATENT DOCUMENTS

| | | | |
|---|---|---|---|
| 23,966 | 5/1859 | Vine | 83/355 |
| 692,601 | 2/1902 | Berger | 83/675 |
| 3,076,999 | 2/1963 | Washburn | 18/1 |
| 3,143,766 | 8/1964 | Rohn | 83/355 |
| 3,196,487 | 7/1965 | Snelling | 425/311 |
| 3,230,582 | 1/1966 | Hoffman et al. | 425/311 |
| 3,292,212 | 12/1966 | Pomper | 425/313 |
| 3,333,298 | 8/1967 | List et al. | 425/313 |
| 3,426,633 | 2/1969 | Jores | 83/355 |
| 3,507,180 | 4/1970 | Greenberg | 83/913 |
| 3,735,661 | 5/1973 | Eichler et al. | 83/355 |
| 3,749,539 | 7/1973 | Galbreath et al. | 425/313 |
| 3,897,020 | 7/1975 | Knecht | 83/675 |
| 4,150,595 | 4/1979 | Loffler et al. | 83/171 |
| 4,240,779 | 12/1980 | Turk | 425/313 |
| 4,251,198 | 2/1981 | Altenburg | 425/311 |
| 4,269,584 | 5/1981 | Kroll et al. | 425/313 |
| 4,534,724 | 8/1985 | Fischer et al. | 425/295 |

FOREIGN PATENT DOCUMENTS

| | | | |
|---|---|---|---|
| 0045387 | 2/1938 | Fed. Rep. of Germany | 425/308 |
| 2142215 | 3/1972 | Fed. Rep. of Germany | 83/913 |

Primary Examiner—Willard Hoag
Attorney, Agent, or Firm—Matthews and Associates

[57] ABSTRACT

A pelletizer blade for use with an underwater extruder-pelletizer is disclosed which includes an impeller surface that keeps the water away form the die face when cutting to prevent uneven cooling of the die face and extruded material. The blade includes a solid rectangular body having an impeller surface extending therefrom and normal thereto. The impeller surface is at a slight angle in the direction of rotation and includes a cutting edge on the side mounted adjacent to the die face.

9 Claims, 1 Drawing Sheet

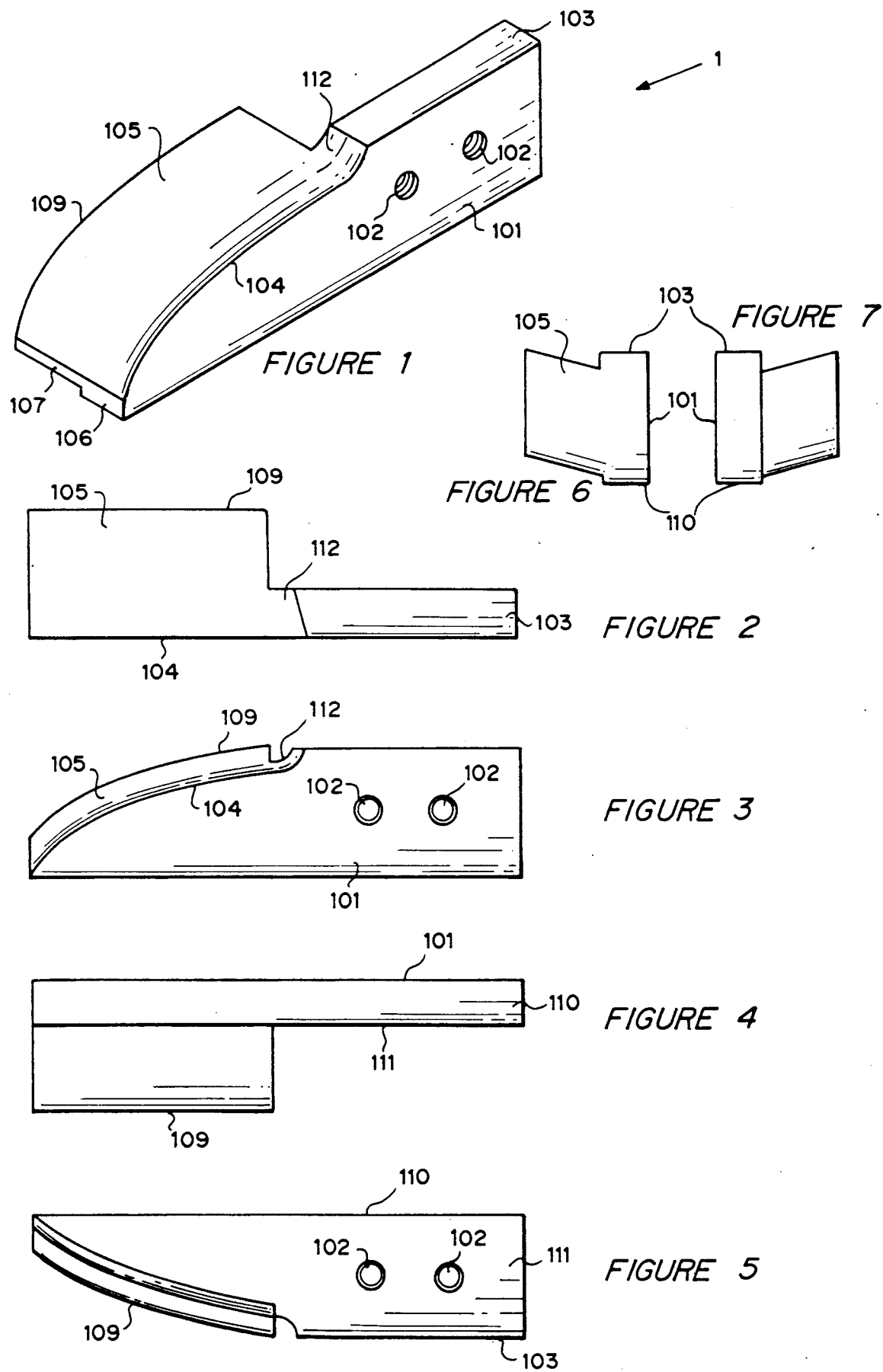

UNDERWATER PELLETIZER BLADE

BACKGROUND OF THE INVENTION

Thermoplastic materials which are used for molding are handled easier if provided in the form of free-flowing granules or pellets of uniform size. The methods of forming such pellets include devices which extrude the plastic material in the form of continuous rods which are severed soon after extrusion and after being cooled in a water bath or while under water at the face of the die.

In the latter case hot thermoplastic material is extruded through extrusion orifices in a die plate. The extruded material pass through the orifices in the form of hot thermoplastic rods from a flat portion of the die plate into a water filled chamber having water circulating therein. While immersed in the water, the rods are cut into pellets by knives mounted on a rotor driven by a shaft. One such device is a Farrel underwater pelletizer manufactured by Farrel Corp. which has been in use for a number of years.

The devices as previously used have some drawbacks. All the knife blades previously used allow the circulating water to remain in contact with the die face. The water can cause uneven cooling of the die face which causes plugging of the orifices. Thus slower extrusion rates occur in the coolest area of the die face with the slower extruded material being cut into shorter lengths and the faster extruded material cut in longer lengths. The uneven length produces "fines" which may cause difficulty in some final applications. Additionally, the cooler pellets may not be cleanly cut and retain a "smear" of uncut material referred to as "tails". These tails may become separated during handling causing additional "fines".

SUMMARY OF THE INVENTION

The inventor herein has devised a blade or knife which, when used with an underwater pelletizing machine such as the Farrel device, acts as an impeller to keep the die face clear of water and hence prevent cooling of the extruded material at the die face. The blade comprises a body adapted to be mounted on a cutting rotor of an underwater pelletizing machine. Extending from the body is an arcuate impeller surface which is normal to the body and at a slight angle (about 10°) in the direction of rotation. The arcuate surface reduces horse power requirements while the angle makes the blade act as impeller driving the water away from the die face. The impeller surface includes a cutting edge on the side mounted adjacent the die face. The blade may be of a single unitary machined piece of any suitable material such as various grades of carbon steel, stainless steel, alloys or tool steel.

BRIEF DESCRIPTION OF THE DRAWING

FIG. 1 is a perspective of the preferred embodiment of the blade of the present invention.

FIG. 2 is a top view of the embodiment shown in FIG. 1.

FIG. 3 is a side view of the side of the embodiment of FIG. 1 which is mounted away from the die face.

FIG. 4 is a bottom view of the embodiment shown in FIG. 1.

FIG. 5 is a reverse view of the embodiment of FIG. 1 showing the side mounted adjacent the die face.

FIG. 6 is a front view of the embodiment shown in FIG. 1.

FIG. 7 is a rear view of the embodiment shown in FIG. 1.

DESCRIPTION OF THE PREFERRED EMBODIMENT

For a detailed description of the preferred embodiment of the present invention, the reader is directed to the accompanying figures in which like components are given like numerals for ease of reference.

In FIGS. 1 and 4 the blade is shown to have a substantially solid rectangular body having a top surface 103, a bottom surface 110 and two side surfaces, 111 and 101, major and minor flat surfaces, respectively. The blade is mounted to a rotating hub (not shown) such that side surface 101 is away from the die face and side surface 111 is adjacent the die face. Apertures 102 are provided in the side surfaces 101 and 111 to mount the blade to the hub by conventional means such as screws or bolts.

Extending from the rectangular body and normal to it is an arcuate impeller surface 105 defined between the two arcuate edges 104 and 109. Arcuate edge 109 which is adjacent the die face when the blade is mounted comprises the cutting edge of the blade. Additionally the blade is mounted to the hub such that the impeller surface 105 faces the direction of rotation, the direction of rotation of the blade 1 being up in FIGS. 1, 3, 6 and 7. The blades may be manufactured for rotation in either direction, however, the angle of surface 105 must be in the direction of rotation.

Referring now to FIGS. 3, 6 and 7 the arcuate impeller surface is shown to be at a light angle to the horizontal in those figures. That is the impeller surface is angled slightly upward in the direction of rotation. Preferably, the angle is about 10°. The angle must not be too great, less than 45°, otherwise the purpose will be defeated by suction and circulation of water behind and through the blade. Additionally, greater angles cause wear on the die face. Because of the slight angle, the edges 104 and 109 have different radii of curvature. In one embodiment, the radius of curvature of edge 104 is 3.5 inches and the radius of curvature of edge 109 is 3.625 inches. Additionally, between the body and the impeller surface there is an arcuate transition area 112 having a reverse radius to the edges 104 and 109 of about 9/32 inch. The front of the impeller surface includes flat areas 107 and 106 to complete the impeller.

When the blade is mounted on a hub of an underwater pelletizer, and the hub is rotated edge 109 will cleanly cut the extruded material and the impeller will push the water away from the die face. Normally the blades are mounted in groups of 4 to 16 on a single hub. The arcuate edges 104 and 109 of the impeller surface 105 reduce horse power requirements while the slight angle of the impeller surface in the direction of rotation creates the impeller action.

The cutting edge 109 need not be excessively sharp because of the scissor cutting action between the blade and the die face. However, if the blades are to be used on worn die faces a bevel downward and inward toward the body may be desirable.

The foregoing description of the invention has been directed to a particular preferred embodiment of the present invention for purposes of explanation and illustration. It will be apparent to those skilled in the art that many modifications and changes in the apparatus may be made without departing from the scope and spirit of the invention. It is, therefore, intended that the following claims cover all equivalent modifications and variations as fall within the scope of the invention as defined by the claims.

What is claimed is:

1. A pelletizer blade for mounting on a rotatable hub adjacent a die face of an underwater extruder-pelletizer, comprising a substantially rectangular solid body portion having opposed flat major and minor surfaces, an arcuate impeller surface portion extending generally perpendicularly away from said body portion at such an angle to the flat surfaces as to push water away from said die face as said hub is rotated, said arcuate impeller surface portion having a cutting edge on the side opposite the major flat surface, said arcuate impeller surface having a first radius of curvature adjacent the major flat surface and a second radius of curvature on a cutting edge opposite the major flat surface.

2. The pelletizer blade of claim 1 wherein said angle is about 10° from a normal to the flat surfaces.

3. The pelletizer blade of claim 1 wherein said arcuate impeller surface has a first radius of curvature on an edge adjacent the major flat surface of about 3.5 inches and a second radius of curvature on the cutting edge opposite the major flat surface of about 3.625 inches.

4. The pelletizer blade of claim 1 further comprising an arcuate transition surface between said body portion and said impeller surface portion having a radius of curvature of about 9/32 inch in the opposite direction as the radii of curvature of said impeller surface.

5. A pelletizer blade for mounting on a rotating hub adjacent a die face of an underwater extruder-pelletizer comprising:
  (a) a substantially rectangular solid body portion member having a longitudinal axis, said axis being parallel to major and minor generally flat surfaces of said body portion;
  (b) an arcuate impeller surface portion extending away from said body portion in a direction normal to said axis, said surface being at an angle of about 10° from a normal to said axis; and
  (c) a cutting edge on said impeller surface opposite the major flat surface.

6. The pelletizer blade of claim 5 wherein said arcuate impeller surface portion has a first radius of curvature on an edge adjacent the major flat surface and a second radius of curvature of about 3.625 inches on the cutting edge opposite the flat major surfaces.

7. The pelletizer blade of claim 5 further comprising an arcuate transition surface between said body member and said impeller surface having a radius of curvature of 9/32 inch in the opposite direction as the radii of curvature of said impeller surface.

8. A pelletizer blade for mounting on a rotatable hub adjacent a die face of an underwater extruder-pelletizer, comprising:
  (a) a substantially rectangular solid body portion having a longitudinal axis, said axis being parallel to major and minor flat surfaces of said body portion;
  (b) an arcuate impeller surface extending away from said body member in a direction normal to said axis, said surface being at an angle of about 10° from said arcuate impeller surface having a first radius of curvature on the edge adjacent the major flat surface of about 3.5 inches and a second radius of curvature on a cutting edge of about 3.625 inches;
  (c) an arcuate transition surface between said body member and said impeller surface having a radius of curvature of 9/32 inch in the opposite direction as the radii of curvature of said impeller surface.

9. A pelletizer having a blade according to claim 1 wherein said blade is mounted on a rotatable hub of the pelletizer with the cutting edge mounted closely adjacent a die surface of an extruder.

* * * * *